United States Patent
Urban et al.

(10) Patent No.: US 6,434,712 B1
(45) Date of Patent: Aug. 13, 2002

(54) METHOD AND APPARATUS FOR FAULT TOLERANT EXECUTION OF COMPUTER PROGRAMS

(75) Inventors: Gerhard Urban; Heinrich Fischer, both of Bremen (DE)

(73) Assignee: DaimlerChrysler Aerospace AG, Ottobrunn (DE)

( * ) Notice: Subject to any disclaimer, the term of this patent is extended or adjusted under 35 U.S.C. 154(b) by 0 days.

(21) Appl. No.: 09/286,174

(22) Filed: Apr. 5, 1999

(30) Foreign Application Priority Data

Apr. 4, 1998 (DE) ......................................... 195 15 263

(51) Int. Cl.[7] ................................................ G06F 11/16
(52) U.S. Cl. ............................. 714/12; 714/10; 714/11
(58) Field of Search ................................. 714/6, 12, 10, 714/11, 797

(56) References Cited

U.S. PATENT DOCUMENTS

| | | | | |
|---|---|---|---|---|
| 4,015,246 A | * | 3/1977 | Hopkins, Jr. et al. .... | 340/172.5 |
| 4,356,550 A | * | 10/1982 | Katzman et al. ............ | 364/200 |
| 4,453,215 A | * | 6/1984 | Reid .......................... | 364/200 |
| 4,750,177 A | * | 6/1988 | Hendrie et al. ............... | 371/32 |
| 4,757,442 A | * | 7/1988 | Sakata ........................ | 364/200 |
| 4,907,232 A | * | 3/1990 | Harper et al. ................. | 371/36 |
| 4,937,741 A | * | 6/1990 | Harper et al. ............... | 364/200 |
| 4,964,126 A | * | 10/1990 | Musicus et al. .............. | 371/36 |
| 4,965,717 A | * | 10/1990 | Cutts, Jr. et al. .......... | 364/200 |
| 4,967,347 A | * | 10/1990 | Smith et al. ................. | 364/200 |
| 5,226,152 A | * | 7/1993 | Klug et al. .................. | 395/575 |
| 5,295,258 A | * | 3/1994 | Jewett et al. ................ | 395/575 |
| 5,313,628 A | * | 5/1994 | Mendelsohn et al. ....... | 395/575 |
| 5,317,752 A | * | 5/1994 | Jewett et al. ................ | 395/750 |
| 5,325,518 A | * | 6/1994 | Bianchini, Jr. .............. | 395/575 |
| 5,600,784 A | * | 2/1997 | Bissett et al. ............ | 395/182.1 |
| 5,751,932 A | * | 5/1998 | Horst et al. ............... | 395/182.1 |
| 5,790,397 A | * | 8/1998 | Bissett et al. ................ | 364/131 |
| 5,890,003 A | * | 3/1999 | Cutts, Jr. et al. ........... | 395/736 |

FOREIGN PATENT DOCUMENTS

DE            4401168            8/1994

* cited by examiner

*Primary Examiner*—Robert Beausoleil
*Assistant Examiner*—Michael Maskulinski
(74) *Attorney, Agent, or Firm*—W. F. Fasse; W. G. Fasse (57) ABSTRACT

A circuit arrangement for the fault tolerant execution of digital computer programs includes a plurality of arithmetic logic units embodied as processor pool elements connected together so that they can each execute the program in parallel. The processor elements are connected to each other through respective data, clock and reset cross-strapping interconnect lines, and are each connected to one or more serial field buses. Each processor element includes at least one microprocessor controller for controlling the functions of the processor element in such a manner that any selected number of the processor elements can be automatically actuated at any time to simultaneously execute the program in parallel and thereby achieve a prescribed degree of redundancy in the circuit arrangement. The data cross-strapping line transmits data among the several processor elements, the clock signal cross-strapping line achieves a compelled synchronization of all of the processor elements, and the reset cross-strapping line carries out the deactivation of any processor element that is recognized as carrying out a faulty execution of the program or that is not necessary for achieving the required degree of redundancy. A deactivated processor element may later be reactivated to again participate in the parallel execution of the program.

9 Claims, 4 Drawing Sheets

METHOD AND APPARATUS FOR FAULT TOLERANT EXECUTION OF COMPUTER PROGRAMS

This application is based on and claims the priority under 35 U.S.C. §119 of German Patent Application 198 15 263.9, filed on Apr. 4, 1998, the entire disclosure of which is incorporated herein by reference.

FIELD OF THE INVENTION

The invention relates to an apparatus for the fault tolerant execution of programs and particularly digital computer programs, by the parallel operation of plural processor units operating as redundancy units. The invention further relates to a method of operating such an apparatus, and to the processor units included in the apparatus.

BACKGROUND INFORMATION

An apparatus or system of the above mentioned general type is disclosed in German Patent Publication 4,401,168. The disclosed apparatus includes a plurality of redundancy units, and can include various different types of serial bus interfaces, such as for a field bus or a MIL-1553 bus or the like, for example.

The degree of redundancy of the known apparatus can be selected variably as desired by means of simple on and off switching of the respective selected redundancy units. In this context, the parallel control can be operated independently of the process interface. The cited reference also describes how the redundancy units are to be interconnected with each other so that the apparatus can achieve a fault tolerant execution of application programs or user programs.

The above described known apparatus suffers several disadvantages. First of all, the maximum desired degree of redundancy must be known or determined before construction of the apparatus, so that the circuit arrangement is properly embodied to achieve the desired maximum degree of redundancy. Therefore, the production of the redundancy units cannot be carried out independently of the specific end use for which the apparatus is to be utilized. It is a significant disadvantage that the redundancy units must be designed, constructed and arranged specifically dependent on the particular application.

Secondly, significant technical efforts and costs are necessary for integrating different types of serial bus interfaces or process interfaces into the known apparatus. As a result, the finished apparatus or circuit arrangement necessarily has a high cost, especially because no standardized interfaces are available for the connection of such buses.

Moreover, difficulties can arise during maintenance procedures, if one or more of the redundancy units need to be switched off or deactivated for testing, reprogramming or the like. Such problems also affect the ability of the apparatus to carry out a standby mode of operation, for example when the apparatus is used in an automation system.

SUMMARY OF THE INVENTION

In view of the above it is an object of the invention to provide an apparatus or circuit arrangement for fault tolerant execution of programs, of the general type initially discussed above, which is considerably more flexible, variable, and adaptable in its end use configuration and embodiment, so that it may be selectively used for various different applications without requiring specialized fabrication or assembly thereof. It is a further object of the invention to provide a method of adaptably or flexibly operating such an apparatus, and to provide components making up such an apparatus. The invention further aims to avoid or overcome the disadvantages of the prior art, and to achieve additional advantages, as apparent from the present specification.

The above objects have been achieved according to the invention in a circuit arrangement for fault tolerant execution of programs, comprising a plurality of arithmetic logic units or processor elements arranged as redundancy units in a processor pool, a data line for transmitting data among the processor elements, a clock line for the forced or compelled synchronization of the several processor elements of the arrangement, and a reset line for selectively switching on and off or activating and deactivating each one of the processor elements. The data line, the clock line, and the reset line are respectively embodied as respective first, second and third cross-strapping interconnections. Each one of the processor elements comprises a respective microprocessor controller for controlling the functions of the respective processor element in such a manner that the overall circuit arrangement can be selectively operated using only one or a selected plurality of the available processor elements in parallel, as needed. In this context, a selected number of the processor elements, corresponding to the desired degree of redundancy as prescribed by the respective input coding or program, can be connected, activated and operated in parallel to each other in the circuit arrangement via the data line, the clock line, and the reset line. Moreover, the circuit arrangement comprises a simplex or multiplex serial field bus and a plurality of serial bus controllers respectively allocated to the plural processor elements, wherein the processor elements are connected respectively by the allocated serial bus controllers to the serial field bus.

It is possible to utilize the inventive circuit arrangement generically for many different and independent applications, without requiring special technical adaptations or alterations of the circuit arrangement. As a result, the present circuit arrangement can be manufactured generically or uniformly in a mass production process, to produce a large piece count of identical circuit arrangements. In contrast, the prior art circuit arrangements are typically assembled essentially individually from discrete components to achieve different circuit configurations in small piece counts for particular applications. The present circuit arrangements, on the other hand, can be economically manufactured as highly or large-scale integrated circuit components incorporating all the necessary sub-components, whereby the present fault tolerant processor can be manufactured in a similar manner and with a similar format and package as is presently typical for a simple non-parallel processor unit.

The invention substantially reduces the effort, expense and complexity involved in utilizing the circuit arrangement in particular applications. For example, the fault tolerant processor described in German Patent Publication 4,401,168 requires four independent computer boxes or cases that are equipped with up to three VME (Versa Module Europe) boards for a particular application in a space flight project. In contrast, using the inventive circuit arrangement, such a fault tolerant computer can be realized on a single VME board. The total effort, complexity and expense of hardware components that is now necessary in the context of the invention is only a small portion (namely only a few highly integrated modules) of the total hardware effort, expense and complexity that was necessary for utilizing conventional processors as described above.

Another advantage achieved according to the invention in contrast to the prior state of the art, is that a fault tolerant application program or user program without modification can be executed in the present circuit arrangement both in a redundant fault tolerant operating mode using a plurality of processor elements as well as in a simplex or non fault tolerant mode using only a single processor element.

While the available degree of redundancy of the circuit arrangement operating in the simplex mode is no greater than that of a simple processor, the operation of the present circuit arrangement in the simplex mode still offers considerable advantages or simplifications to the user. For example, the first time the user or application program is executed, the simplex operation of the present circuit arrangement will at first mask all errors or faults that arise through the voting process.

Furthermore, the simplex operation of the present circuit arrangement simplifies and economizes the standby operation of an automation system, because the circuit arrangement can be seamlessly switched to simplex operation without interruption, and the power consumption for the simplex operation will only be a one $n^m$ fraction of the original power consumption for operating the circuit arrangement with n parallel processor elements. This advantage is especially considerable and important in space flight applications where the available power is strictly limited. Once a spacecraft has reached a secure orbit, the operator of the spacecraft can switch off all but one of the processor elements in the circuit arrangement, in order to conserve energy without interrupting the user functions being carried out. Thus, a single circuit arrangement provides full fault tolerant parallel redundancy in one operating mode, and also provides power conserving non-redundant operation in another mode without requiring complicated switch-over processes.

Another special advantage of the inventive arrangement is achieved in the case of maintenance of an automation system. In this context, the automation system can be operated with the processor circuit arrangement in the simplex operation mode for a limited period of time, while the other processor elements are switched to an inactive waiting condition so that they can be tested or so that the user software loaded into these processor elements can be exchanged or updated. Thus, the automation system can continue operating without interruption, even while carrying out hardware testing or software exchanges or upgrades of the redundant processor elements in an inactive or maintenance mode.

According to further details of the invention, an external memory is preferably respectively allocated to each one of the processor elements. Moreover, the circuit arrangement can further comprise at least one application processor, which is connected to at least one processor element via a multiprocessor bus such as a VME bus.

An arithmetic logic unit or processor element suitable for use in the inventive circuit arrangement includes at least one microprocessor controller and is embodied to form a so-called processor pool element (PPE) module, wherein the microprocessor controller controls the functions of the respective processor element and is adapted to carry out a data comparison and a data exchange with other similar processor elements interconnected to each other. This PPE module can be embodied as a multichip module, a hybrid circuit, a piggyback module, a so-called "system on a chip", or any other similar known miniaturized processor module.

The PPE module further preferably comprises an electrically erasable and programmable read memory (such as an EEPROM) for storing appropriate programs for controlling the processor element. The PPE module may further comprise a standardized parallel bus interface including data and control lines for connecting the respective processor element to at least one serial bus.

Moreover, the PPE module preferably comprises a control unit for fault handling, as well as a first cross-strapping interface allocated to the fault handling controller to achieve a serial interconnection with other processor elements in the circuit arrangement. The PPE module may also comprise a fault tolerant clock signal generator circuit for achieving the compelled or despotic synchronization of the respective PPE module with the other processor elements of the circuit arrangement, as well as a second cross-strapping interface allocated to this clock signal generator circuit to provide a serial interconnection with the other processor elements. The PPE module preferably comprises a fault tolerant reset control circuit as well as a third cross-strapping interface allocated to the reset control circuit for achieving a remote reset control. Finally, the PPE module is preferably further provided with a circuit that allocates a characteristic identifier to the respective processor element.

BRIEF DESCRIPTION OF THE DRAWINGS

In order that the invention may be clearly understood it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
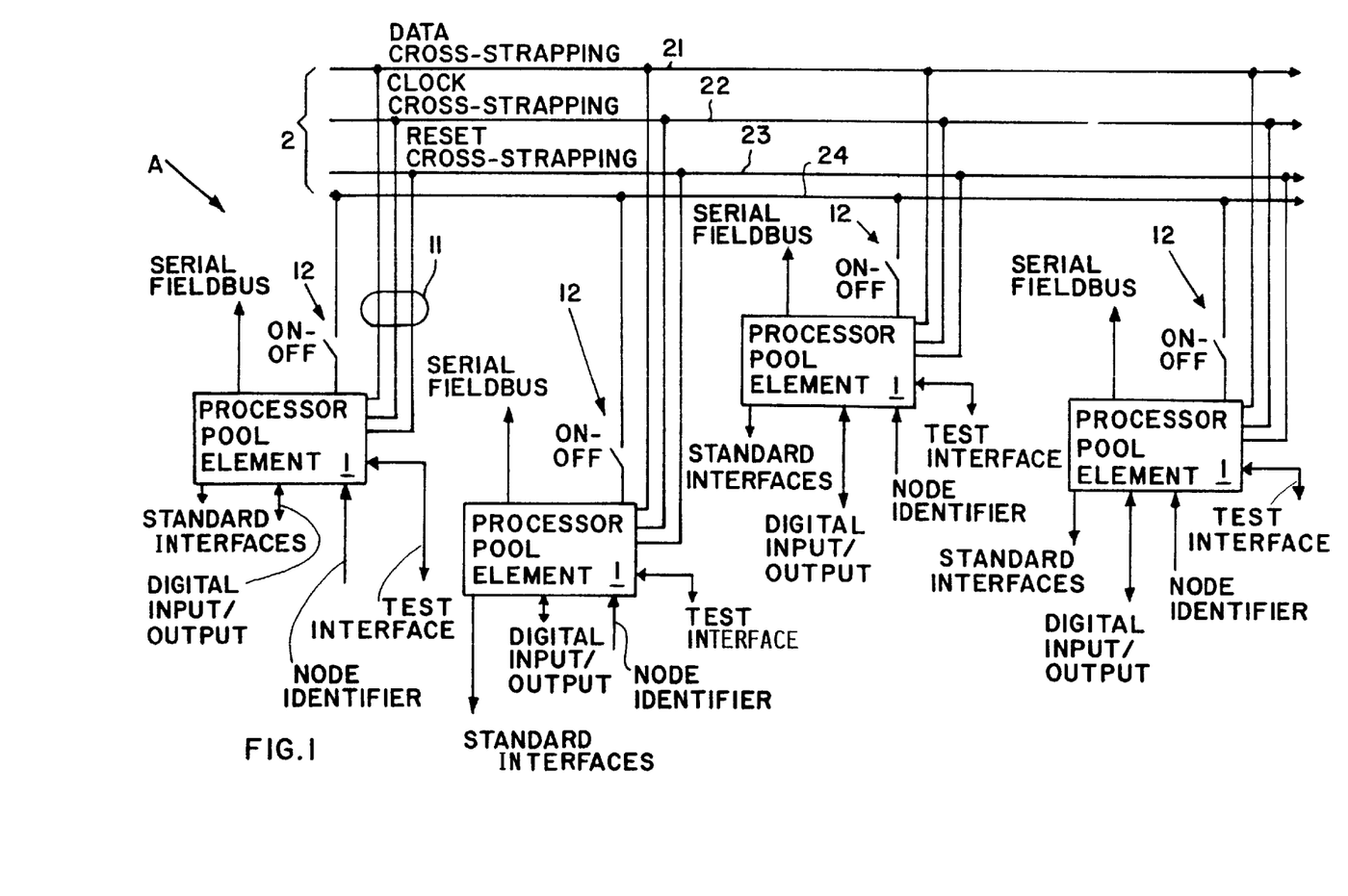
FIG. 1 is a schematic block circuit diagram of the overall layout of the inventive circuit arrangement.

As shown in the schematic overview of FIG. 1, the apparatus or circuit arrangement A according to the invention is generally embodied as a processor pool comprising a plurality of generic processor pool elements or arithmetic logic units 1 interconnected according to a flexible processor pool technology. The circuit arrangement A further utilizes standardized interfaces 11 for respectively connecting the generic processor pool elements 1 to each other through various cross-strapping lines of a cross-strapping interconnect 2. Whenever more than one processor element 1 are activated and interconnected together, the circuit arrangement A is able to achieve the fault tolerant execution of a program by redundantly executing the program, or copies thereof, in the several processor elements 1 in parallel.

More particularly, any selected or desired number of individual processor elements 1, which are also called fault containment regions (FCR) in the art, are connected with each other through their respective interfaces 11 via the cross-strapping interconnect 2, so as to integrate the operating processor elements 1 into the overall processor pool circuit arrangement A according to the invention. The active processor elements 1 thereby operate in concert and in parallel with each other, for executing programs in a fault tolerant manner. For interconnecting the several processor elements 1 in this manner, the cross-strapping interconnect 2 includes a data cross-strapping interconnect line 21, a clock cross-strapping interconnect line 22, a reset cross-strapping interconnect line 23, and a power supply line 24, which are respectively suitable for connection to any desired number of individual processor pool elements 1.

According to the invention, the present processor pool arrangement A achieves a flexible degree of redundancy that can be selected as needed for any end use application and for different operating modes in any particular application. Thus, a particular required degree of redundancy no longer needs to be known or specified in advance for the proper fabrication and assembly of the computer circuit components. Moreover, the flexible degree of redundancy can even be reduced to zero or null redundancy, which can also be termed a simplex operating mode, without interrupting the user or application functions. The circuit features and operations for achieving this flexibly variable or selectable redundancy architecture will now be described.

Each one of the processor elements 1 is respectively connected to the power supply line 24 by a respective independently and selectably controllable on-off switch 12. If only one of the processor elements 1 is switched on or actuated by switching on the respective allocated on-off switch 12, then the circuit arrangement A is automatically configured as a simplex processor with zero redundancy, wherein the single activated processor element 1 executes the user or application program. On the other hand, if a plurality of processor elements 1 are simultaneously activated by switching on the respectively allocated switches 12, then the circuit arrangement A is automatically configured as a multiplex or parallel processor arrangement, in which the several active processor elements 1 simultaneously and in parallel execute the user or application program.

In this context, a duplex processor arrangement is achieved when two of the processor elements 1 are switched on, a triplex processor arrangement is achieved when three of the processor elements are switched on, a quadruplex processor arrangement is achieved when four of the processor elements 1 are switched on, or generally an N-plex processor arrangement is achieved when N of the processor elements 1 are switched on. The maximum parallelism or redundancy is achieved when all of the processor elements 1 included in the circuit arrangement A are activated, and is thus limited to the total number of processor elements in the circuit arrangement A.

Appropriate circuit elements of the circuit arrangement A ensure that the several selected processor elements 1 are switched on sufficiently simultaneously. In this context, the required simultaneity can extend over a fixed defined time interval, which can be previously set by the circuit arrangement. This time interval begins at the time of switching on the first processor element 1. Any further processor elements 1 that are switched on during this time interval will participate in the simultaneous and parallel execution of the user or application program. On the other hand, the processor elements 1, if any, which are switched on after the expiration of the established time interval will not participate in the parallel execution of the user or application program. Instead, such processor elements 1 that were switched on too late will automatically enter into a waiting condition.

If all of the processor elements 1 have been switched on sufficiently simultaneously, i.e. within the prescribed time interval, then all of the available processor elements will execute the user or application program in parallel, and the overall circuit arrangement A has achieved the highest possible multiplex configuration stage. For example, if the circuit arrangement A includes a total of four processor elements 1, then the circuit arrangement A will operate in a quadruplex configuration with the maximum of these four processor elements all operating in parallel.

Any one of the processor elements at any time, even while it is participating in the parallel or redundant execution of a program, can be switched into an inactive state in which it does not participate in the parallel execution of the program, either by being powered-down or switched off by means of the respective associated switch 12 (off condition), or as a consequence of a reset command provided by the circuit arrangement A as discussed below (waiting condition). Whenever such an individual processor element is deactivated, the execution of the program continues without interruption by the other active processor elements 1. In the event that a particular processor element is deactivated responsive to the reset command provided by the circuit arrangement, then this particular processor element 1 will be transferred into a waiting condition in which it remains powered-up but no longer participates in the parallel execution of the program. In general, from the above discussion, it is apparent that any individual processor element 1 can at any time be in one of three conditions or modes, namely a normal operating mode, a waiting condition, or a completely switched-off condition.

Through any known procedures and means, for example in connection with known voting procedures, the faulty execution of the program by one of the parallel operating processor elements 1 will be recognized in comparison to the proper execution of the program by the one or more other active processor elements. Responsively to such recognition, a reset signal is released so that the faulty processor element will then be reset and switched into the waiting condition.

Any one or more of the processor elements 1 that have been reset and are in the waiting condition can be reactivated and seamlessly reintegrated into operation of the overall circuit arrangement A. Thereby, the reactivated and reintegrated processor element seamlessly begins again to cooperate in the parallel execution of the running program that is being executed in the one or more processor elements that remained active, without requiring the program to be interrupted or restarted. This is achieved by special circuit components and functions carried out in the circuit arrangement A, for example by means of frequency modulated signals provided at the interfaces of the processor elements. Such signals ensure the proper synchronization with the program step being executed by the other active processor elements, in addition to the clock signal synchronization.

Such seamless engagement or reengagement of one or more additional processor elements 1 to cooperate with the parallel execution of the program already being executed by one or more previously active processor elements allows the circuit arrangement A to be automatically switched from a simplex processor mode to a fault tolerant redundant duplex processor mode, and further allows a duplex processor mode to achieve the higher degree of redundancy of a triplex processor mode, and so forth.

A synchronizing circuit within the circuit arrangement A ensures that all of the processor elements 1 are despotically or compulsively synchronized with each other immediately after their being switched on. An especially important further feature is that all of the processor elements 1 that are in the waiting condition or mode are also compulsively synchronized. In addition to the internal compelled or despotic synchronization, the entire circuit arrangement A can be despotically or compulsively synchronized externally. This means that all of the processor elements will be synchronized with each other and simultaneously will be compulsively synchronized with an external synchronization signal, e.g. for cooperation with external circuit components.

Figure 2:
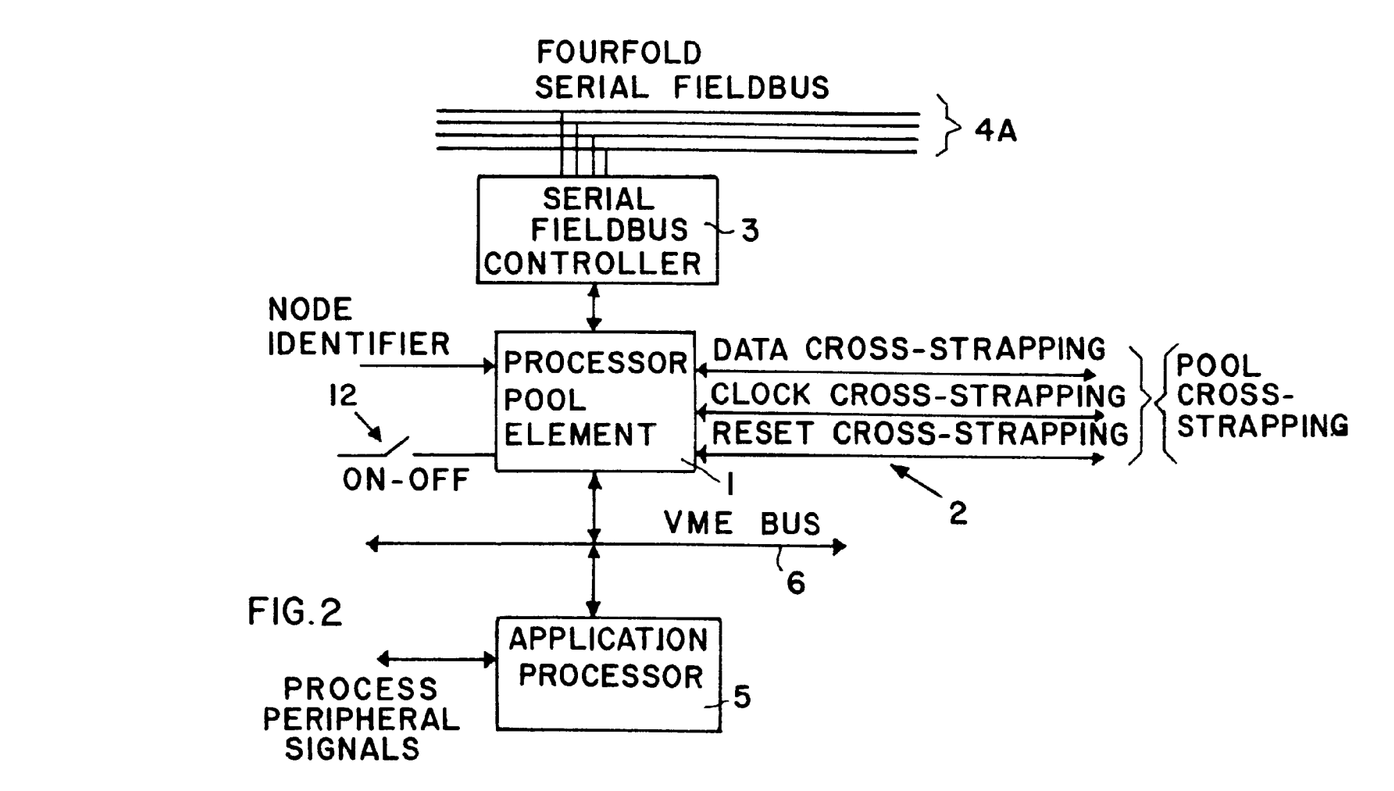
FIG. 2 is a schematic block circuit diagram of a first embodiment of an external circuit connection of a processor pool element for a complex fault tolerant system.
Figure 3:
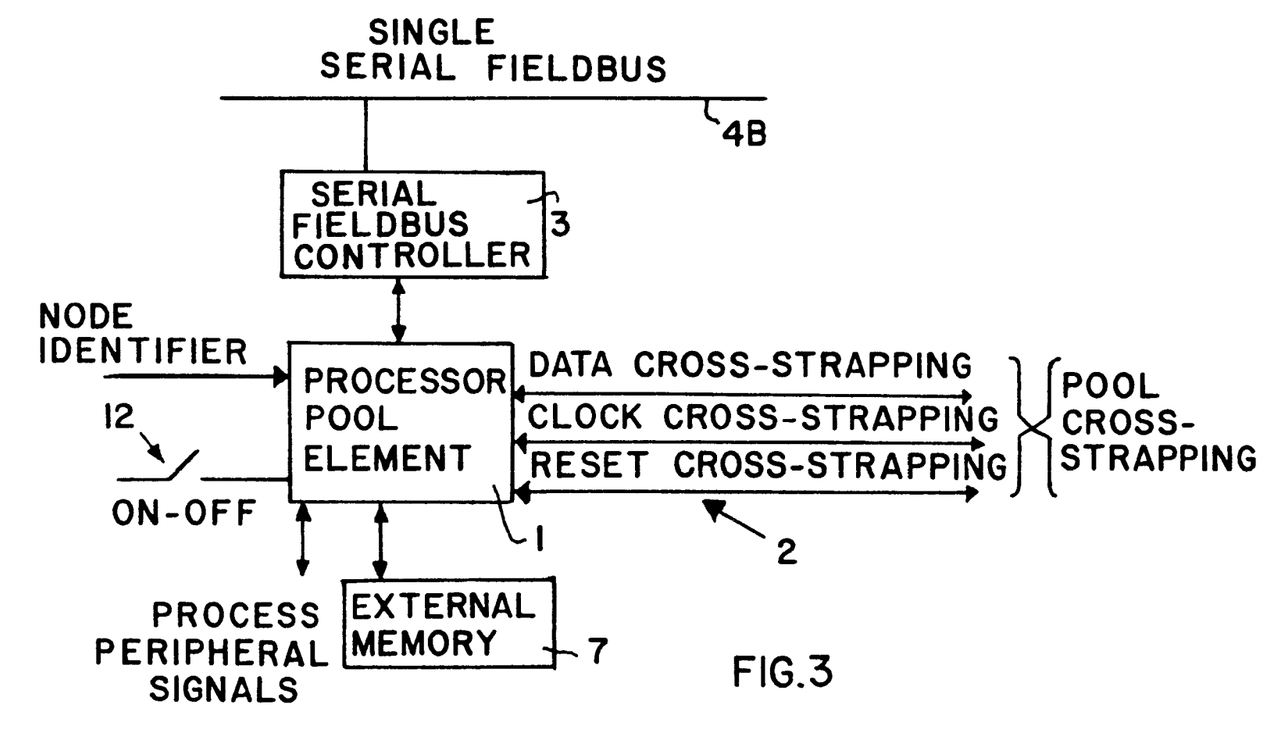
FIG. 3 is a schematic block circuit diagram of a second embodiment of an external circuit connection of a processor pool element for a simple fault tolerant system.

FIG. 2 schematically illustrates a first embodiment of an external circuit connection of a processor element 1 according to the invention. In the embodiment of FIG. 2, a relatively complex redundancy unit is established, in contrast to the relatively simple second embodiment shown in FIG. 3. The essential difference between the two circuit embodiments is that according to FIG. 2 a four-fold or quadruplex serial field bus 4A is connected to the processor element 1 through a serial field bus controller 3, while according to FIG. 3 a single or simplex serial field bus 4B is connected to the processor element 1 through the serial field bus controller 3.

As a further difference, the complex circuit embodiment according to FIG. 2 comprises an additional application processor 5 that is connected in common with the processor element 1 to a VME bus 6. On the other hand, the simple circuit embodiment according to FIG. 3 does not include such an application processor 5, but instead simply has an external memory 7 connected to the processor element 1. In the embodiment of FIG. 2, the application processor 5 receives and outputs various process peripheral signals, while in the embodiment of FIG. 3 such process peripheral signals are received and output by the processor element 1 itself. Each of the embodiments shown in FIGS. 2 and 3 of course also includes the several connections associated with the respective processor element 1 as described above, for example the on-off switch 12 and the cross-strapping interconnect 2 connected to each processor element 1.

Figure 4:
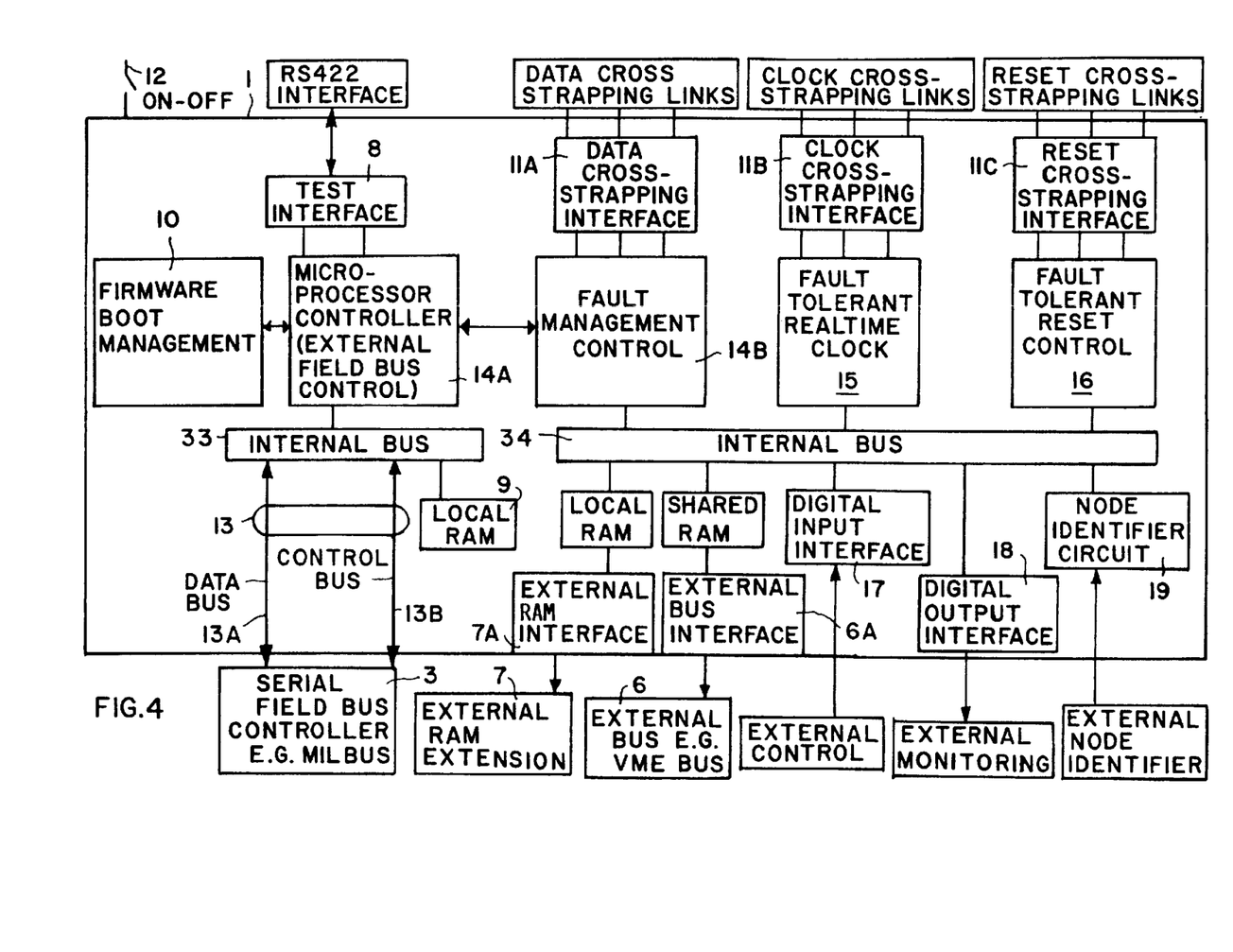
FIG. 4 is a schematic block circuit diagram of the internal layout and arrangement of one arithmetic logic unit or processor element according to the invention.

FIG. 4 schematically shows the internal components and arrangement of a single processor element 1 according to the present invention for carrying out the functions described herein and for effective integration of the various serial buses as well as the process interfaces. In this context, a processor element 1 is embodied as a processor pool element (PPE) module, which comprises one or two high power microprocessor controllers 14A and 14B for controlling all essential functions of the processor element 1 and particularly for providing the connection to the serial data bus and the execution of the data comparison and the data exchange principles.

In detail, the processor element 1 embodied as a PPE module comprises an electrically erasable and programmable readable memory 10 (such as an EEPROM), which stores the programs for controlling the processor element 1 and thus represents boot management firmware. This readable memory element 10 is arranged and programmed in such a manner so that upon actuation it automatically transfers the program(s) stored therein to the microprocessor controllers, and particularly the external field bus controller 14A and the fault management controller 14B. Simultaneously, new programs can be loaded into the readable memory 10 through a test interface 8 connected to the external field bus controller 14A, by using a special security code embedded in the hardware. The test interface 8 may externally be embodied with any type of convenient connection, such as a RS422 connection.

For making the connection to one or more serial buses, the processor element 1 embodied as a PPE module further comprises a standardized parallel bus interface 13 connected to a first internal bus 33 that is in turn connected to the external field bus controller 14A. This parallel bus interface 13 includes data bus lines 13A and control bus lines 13B. The external field bus controller 14A serves to adapt or accommodate the PPE module to the electrical characteristics of any selected external serial bus controller 3 such as an MIL bus controller, without requiring additional hardware components and complexity.

In order to carry out the data exchange among the several processor elements 1, each processor element 1 embodied as a PPE module comprises a suitable data cross-strapping interface 11A connected to the fault management controller 14B, which is directly connected to the external field bus controller 14A. The data cross-strapping interface 11A carries out the required serial data transmission and simultaneously maintains a galvanic isolation of the individual processor element 1 from the other arithmetic logic units or processor elements 1 of the circuit arrangement. The data cross-strapping interface 11A includes a sufficient total number of independent serial data lines, which are independently selectable or activatable under the control of appropriate microcode, so that the circuit arrangement can be configured as an N-plex system simultaneously using N processor elements processing and exchanging data with each other.

In order to achieve the internal and external compelled or despotic synchronization of the processor elements 1 with each other, each one of the logic units embodied as a PPE module comprises a fault tolerant clock signal generator circuit 15 operating as a fault tolerant real time clock, as well as a suitable clock cross-strapping interface 11B which carries out the necessary clock signal distribution with the other processor elements 1 and simultaneously ensures a galvanic separation of the signals. By means of an external code input, the frequency of the clock signal generator circuit 15 can be prescribed or adjusted. Additionally, the circuit further comprises an internal register in which frequency information may be stored for internally adjusting or setting the frequency of the clock signal generator circuit 15. The number of clock signals, i.e. the number of individual clock signal lines included or activated in the clock cross-strapping interface 11B, can be selectively actuated through a suitable microcode command, so as to configure the circuit arrangement as an N-plex system with N processor elements operating simultaneously and in parallel.

Each processor element further comprises a reset circuit or fault tolerant reset control 16 to carry out the compelled deactivation of faulty-executing processor elements 1 in the circuit arrangement 1, i.e. those processor elements that carry out a faulty execution of the program being executed are deactivated into the waiting condition by releasing a reset signal. The provision of such a reset control 16 in each processor element ensures that the reset function is carried out in a fault tolerant manner, and together also supports the overall or complete execution of functions by the circuit arrangement. Each processor element 1 further comprises a suitable reset cross-strapping interface 11C that connects the fault tolerant reset control 16 to the reset cross-strapping interconnect lines 23, and thereby carries out the necessary reset signal distribution among the several processor elements while maintaining a galvanic separation from the other processor elements. The number of reset signals, i.e. the number of independent reset signal lines included in the reset cross-strapping interface 11C, can be selectively controlled by means of suitable microcode so that the circuit arrangement can be configured as an N-plex system using N processor elements, whereby further this system is enabled to deactivate or otherwise mask or passivate any faulty processor element by means of the reset management provided by the reset controls.

Each processor element 1 further comprises a digital input interface 17 and a digital output interface 18, by means of which system control functions can be input into the respective processor element, and system signals can be monitored, recorded, logged or otherwise protocoled, at any time. Such provision of a direct digital input interface 17 and output interface 18 especially facilitates the construction of very small redundancy units, i.e. processor elements or PPE modules, which may completely omit their own process interfaces 6A for connection to an external bus 6, for example, due to the low degree or level of automation required in the respective application system.

In order to properly organize and carry out the functional flow or processing of all functions to be carried out by the circuit arrangement, it is important that each individual processor element or PPE module 1 is identified by a reversibly unambiguous identifier. This is achieved by a respective node identifier circuit 19 integrated into each processor element 1. In this context, each processor element is labeled or provided with an external identifier code, which is assigned only once for each processor element. The node identifier circuit 19 in each respective processor element 1 interprets the established or set identifier coding and generates a reversibly unambiguous identifier which is able to tolerate even a multi-bit fault.

Each processor element or PPE module 1 further comprises an internal read-write memory or local RAM 9 connected to the first internal bus 33. This memory 9 is provided with or embodies an error detection and correction (EDAC) arrangement.

The fault management controller 14B, the fault tolerant clock signal generator circuit 15, and the fault tolerant reset control circuit 16 are all connected to a second internal bus 34. The digital input and output interfaces 17 and 18 as well as the node identifier circuit 19 are also connected to this internal bus 34.

In order that the present processor element embodied as a multi-chip PPE module 1 can also be used in applications with a high degree or level of automation, the processor element 1 further comprises a suitable parallel data bus interface 7A connected to the second internal bus 34 through a local RAM, so as to supplement or extend the internal read-write memory with external RAM memory modules 7. The parallel data bus interface or external RAM interface 7A includes all the necessary data and control lines for carrying out such memory expansion.

To ensure the trouble-free connection of the present processor element 1 to external process interfaces for a VME bus 6, for example, the processor element 1 further comprises its own external bus interface 6A embodied as a read-write memory circuit including a dual port or shared RAM, for example, connected to the second internal bus 34. With this arrangement, the external bus interface 6A is addressable from the internal multi-chip processor control units described above, and also from any desired external microprocessor located in the external process control arrangement. Access conflicts or contention problems that can arise due to simultaneous addressing are automatically controlled or regulated in such a manner by the external bus interface 6A so as to avoid the possibility of data losses.

The integration of this external bus interface 6A, especially embodied as a dual read-write memory, into the processor element or PPE module 1 is especially advantageous because it allows the processor elements to be constructed as VME compatible or otherwise externally compatible redundancy units, which may be easily interconnected with a rather minimal additional cost, effort and expense for external components. This feature is especially advantageous or even necessary for such redundancy units that will be used in connection with an application that has a high degree of automation, and that includes an additional independent process interface integrated therein, for example through an external bus such as a VME bus 6.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A processor element adapted for connection with at least one additional processor element the same as said processor element to form a fault tolerant parallel processor pool arrangement, said processor element comprising:

at least one microprocessor controller adapted to control functions carried out by said processor element and to carry out a data exchange and a data comparison with the at least one additional processor element;

a local random access memory connected to said microprocessor controller;

data and control lines connected to said microprocessor controller and providing external input and output connections adapted to be connected to an external serial bus;

a test interface connected to said microprocessor controller and providing an external test connection;

a microprocessor fault management controller connected to said microprocessor controller;

a data cross-strapping interface connected to said fault management controller and providing an external data cross-strapping connection;

a fault tolerant clock signal generator connected to said fault management controller;

a clock cross-strapping interface connected to said clock signal generator and providing an external clock cross-strapping connection;

a reset control circuit connected to said fault management controller;

a reset cross-strapping interface connected to said reset control circuit and providing an external reset cross-strapping connection;

an external bus interface connected to said fault management controller and providing an external bus connection;

an external memory interface connected to said fault management controller and providing an external memory connection;

a digital input and output interface connected to said fault management controller and providing an external digital input and output connection;

a node identifier circuit connected to said fault management controller and providing an external identifier connection; and a selectively actuatable on-off power supply switch connected to at least said microprocessor controller.

2. The processor element of claim 1, incorporated into a miniaturized module embodied as a multi-chip module, a system on a chip, a hybrid circuit, or a piggyback module.

3. The processor element of claim 1, further comprising an erasable and programmable readable memory connected to said microprocessor controller, a first internal bus interposed and connected between said microprocessor controller and said local memory and said control and data lines, and a second internal bus interposed and connected between said fault management controller, said clock signal generator, said reset control circuit, said external memory interface, said external bus interface, said digital input and output interface, and said node identifier circuit.

4. The processor element of claim 1, further comprising an electrically erasable and programmable readable memory connected to said microprocessor controller and adapted to store a program for controlling said functions carried out by said processor element.

5. The processor element of claim 1, wherein said external data cross-strapping connection is adapted to be externally serially connected with the at least one additional processor element.

6. The processor element of claim 1, wherein said fault tolerant clock signal generator is adapted to achieve a compelled synchronization of said processor element with the at least one additional processor element, and said external clock cross-strapping connection is adapted to be externally serially connected with the at least one additional processor element.

7. The processor element of claim 1, wherein said external reset cross-strapping connection is adapted to be externally connected to enable a remote reset function.

8. The processor element of claim 1, wherein said external identifier connection is adapted to allocate a characteristic identifier to said processor element.

9. A circuit arrangement for the fault tolerant execution of a program, comprising:
   a) a plurality of processor elements that each respectively comprise:
      a microprocessor controller;
      a local random access memory connected to said microprocessor controller;
      data and control lines connected to said microprocessor controller and providing external serial input and output connections;
      a test interface connected to said microprocessor controller and providing an external test connection;
      a microprocessor fault management controller connected to said microprocessor controller;
      a data cross-strapping interface connected to said fault management controller and providing an external data cross-strapping connection;
      a fault tolerant clock signal generator connected to said fault management controller;
      a clock cross-strapping interface connected to said clock signal generator and providing an external clock cross-strapping connection;
      a reset control circuit connected to said fault management controller;
      a reset cross-strapping interface connected to said reset control circuit and providing an external reset cross-strapping connection;
      an external bus interface connected to said fault management controller and providing an external bus connection;
      an external memory interface connected to said fault management controller and providing an external memory connection;
      digital input and output interface connected to said fault management controller and providing an external digital input and output connection;
      a node identifier circuit connected to said fault management controller and providing an external identifier connection; and
      a selectively actuatable on-off power supply switch connected to at least said microprocessor controller;
   b) a cross-strapping interconnect including a data cross-strapping interconnect line that is respectively connected to said external data cross-strapping connection of each one of said processor elements and adapted to transmit data to or from each one of said processor elements, a clock cross-strapping interconnect line that is respectively connected to said external clock cross-strapping connection of each one of said processor elements and adapted to transmit a synchronizing clock signal to or from each one of said processor elements, and a reset cross-strapping interconnect line that is respectively connected to said external reset cross-strapping connection of each one of said processor elements and adapted to transmit a reset signal to or from each one of said processor elements;
   c) a serial field bus; and
   d) a plurality of serial field bus controllers that are respectively allocated to said processor elements and that respectively connect said external serial input and output connections of each one of said processor elements with said serial field bus;
   wherein any selected number of said processor elements can be activated to process a program in parallel with each other so that said circuit arrangement has a selected degree of redundancy of processing the program.

* * * * *

UNITED STATES PATENT AND TRADEMARK OFFICE
CERTIFICATE OF CORRECTION

PATENT NO.    : 6,434,712 B1
DATED         : August 13, 2002
INVENTOR(S)   : Urban et al.

It is certified that error appears in the above-identified patent and that said Letters Patent is hereby corrected as shown below:

<u>Title page,</u>
Item [30], Foreign Application Priority Data, replace "195 15 263" by -- 198 15 263 --.

Signed and Sealed this

Third Day of December, 2002

JAMES E. ROGAN
*Director of the United States Patent and Trademark Office*